Jan. 8, 1963 O. K. AUSTIN 3,071,803
INTERLOCKED SYSTEM FOR PELLETING AND PELLET DRYING OPERATIONS
Filed June 27, 1960 2 Sheets-Sheet 1

INVENTOR.
O.K. AUSTIN
BY Hudson and Young
ATTORNEYS

Jan. 8, 1963          O. K. AUSTIN          3,071,803
INTERLOCKED SYSTEM FOR PELLETING AND PELLET DRYING OPERATIONS
Filed June 27, 1960          2 Sheets-Sheet 2

INVENTOR.
O. K. AUSTIN
BY Hudson and Young
ATTORNEYS

United States Patent Office 3,071,803
Patented Jan. 8, 1963

3,071,803
INTERLOCKED SYSTEM FOR PELLETING AND
PELLET DRYING OPERATIONS
Oliver K. Austin, Bartlesville, Okla., assignor to Phillips
Petroleum Company, a corporation of Delaware
Filed June 27, 1960, Ser. No. 39,020
9 Claims. (Cl. 18—1)

This invention relates to the control of apparatus employed to pellet granular material and to dry the resulting pellets. In one aspect, it relates to a pelleting and pellet drying system wherein the controls are interlocked in such a manner that a motor failure in one part of the system will stop other motors in that system.

It is common practice to pellet granular material in order that the material can be more easily transported and processed. One important application of such a process occurs in carbon black production. Carbon black, as normally produced, is a low density powder which is extremely difficult to handle. However, the black can be formed into pellets which are more easily transported and processed. A wet pelleting system has recently been developed which provides a pelleted black that is harder and more stable than pelleted blacks previously made by the dry pelleting processes. Wet pellets are formed by agitating loose black and a pelletizing liquid, such as molasses, in a series of mixing conveyors which shape, densify and polish the pellets. The resulting pellets are then dried and conveyed, with or without further processing, to suitable storage or packaging facilities.

In a process of this type wherein a number of different procedural steps are combined by the proper integration of a sequence of mechanical devices, there is always the danger of failure of some piece of equipment in the process line. If such failure occurs, it is important that the process line be stopped upstream from the point of failure, with respect to the direction of flow of the process, as soon as possible in order to avoid a buildup of material in the system or to avoid serious damage to equipment in the process line. An interlocked system of controls having particular utility in the pelleting of carbon black is described and claimed in copending application Serial No. 811,366, filed May 6, 1959, by Mr. D. A. Marsh wherein failure of a motor in the process causes the motors in the process upstream from the failure to be turned off in sequence with the exception of the motor which rotates the rotating drum of the pellet dryer. It has heretofore been considered necessary to continue to rotate the drum of the pellet dryer in case of a shutdown of the process in order to avoid warpage of the rotating drum or other damage to the drum resulting from overheating of the bottom portion of the drum. When rotation of the dryer drum is continued after the remainder of the process, including the conveyor which removes dried pellets from the drum, has been stopped, the scoops which form an integral part of the drum continue to pick up carbon black pellets from the drum and to pass them out of the drum where they are spilled upon the ground and represent a loss of carbon black as well as the creation of a nuisance. Furthermore, in the described system there is no provision of a means or method for protecting the drum of the dryer in case of an entire electrical failure whereby there would be no power to continue rotation of the drum.

Accordingly, it is a principal object of this invention to provide a control system wherein rotation of the dryer drum would be stopped in the event of failure of a motor downstream from the dryer drum and wherein the dryer drum would be protected from overheating whenever rotation of the dryer drum is stopped for any reason. It is also an object of this invention to provide a control system for use in a pelleting process wherein all of the motors in the system can be stopped without danger of damage to any piece of equipment in the system. Still another object of this invention is for the provision of a means for cooling the bottom of the dryer drum when rotation of the drum is terminated by introducing thereto water or steam in an amount sufficient to provide adequate cooling after which the supply of water or steam is terminated. Other objects, advantages and features of the invention will become apparent to one skilled in the art upon study of the disclosure including the following detailed description of the invention together with the accompanying drawings in which:

Figure 1:
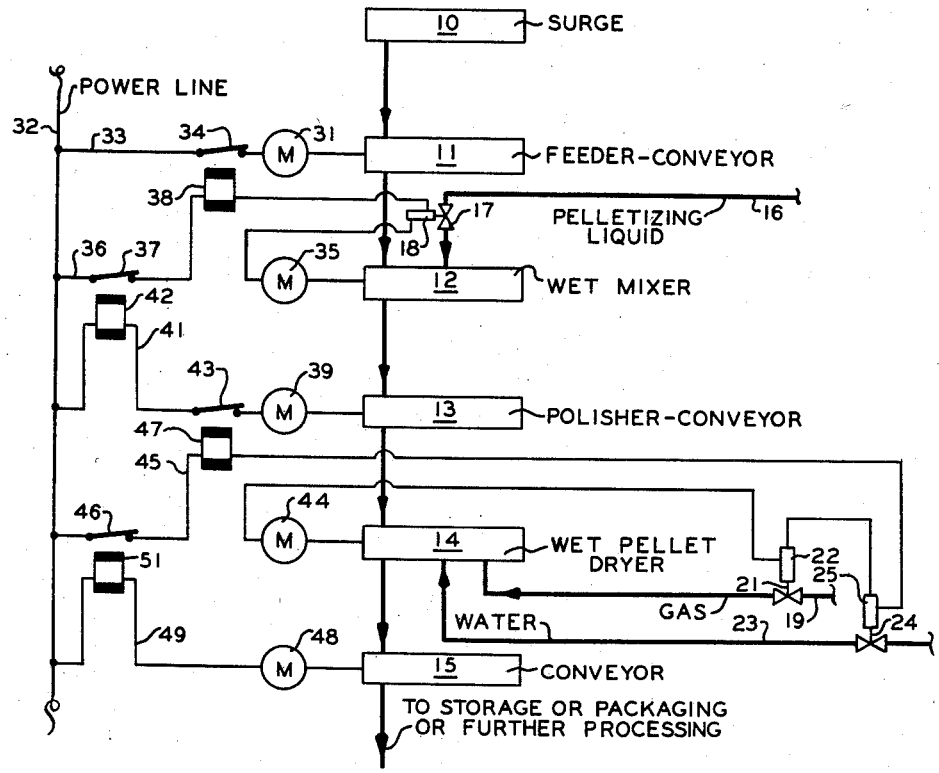
FIGURE 1 is a schematic representation of a wet pelleting system for carbon black.

Referring now to the drawing, and to FIGURE 1 in particular, the loose carbon black to be pelleted is supplied from surge container 10 by feeder-conveyor 11 to the wet pellet mixer 12. Wet pellets are passed from mixer 12 by means of conveyor 13 wherein they are densified, polished and weighed while being conveyed to wet pellet dryer 14. The dry pellets which emerge from dryer 14 are conveyed by means of conveyor 15 to storage, to packaging or to further processing steps as desired. Pelleting liquid such as a dilute solution of molasses is passed via conduit 16 and valve 17 to the wet pellet mixer. Valve 17 can be a solenoid operated, normally closed valve maintained in open position by a solenoid indicated at 18.

A fuel such as gas is introduced to the firebox of dryer 14 via conduit 19 and valve 21, which also can be a normally closed valve maintained in open position by solenoid 22. Conduit 23 is provided to introduce water or steam to the firebox of dryer 14 and contains valve 24 which can be a normally open valve maintained in closed position by solenoid 25.

Conveyor 11 is actuated by motor 31 which derives electrical power from power line 32 by way of electrical line 33 and switch 34. The pellet mixer 12 is actuated by motor 35 which is connected to power line 32 by means of line 36 having therein switch 37, relay coil 38 and solenoid 18. Conveyor 13 is actuated by motor 39 which is connected to power line 32 by means of line 41 having therein relay coil 42 and switch 43. The drum of dryer 14 is rotated by motor 44 which is connected to power line 32 by line 45 having therein switch 46, relay coil 47, solenoid 22 and solenoid 25. Conveyor 15 is actuated by motor 48 which is connected to power line 32 by line 49 having therein relay coil 51.

Figure 2:
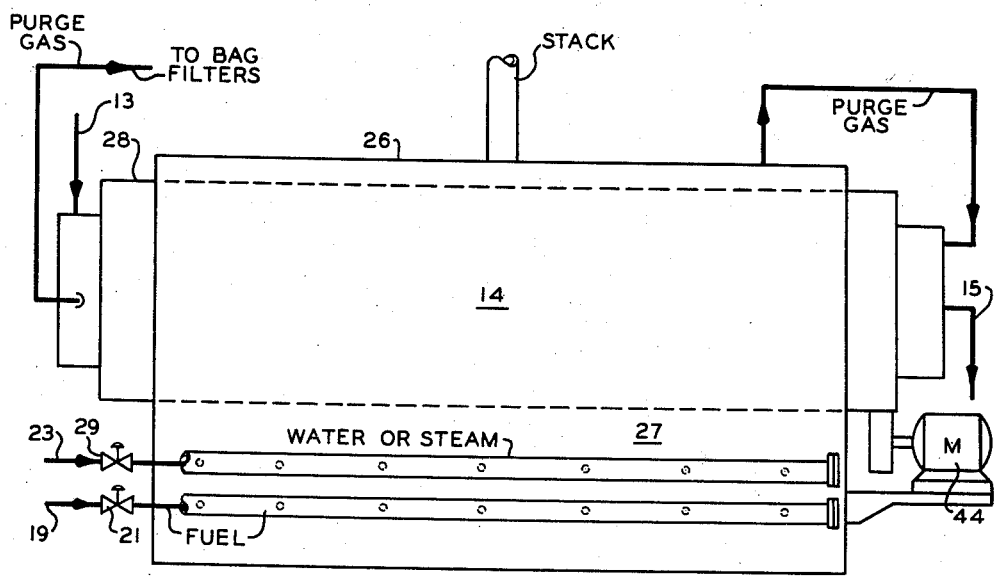
FIGURE 2 is a schematic elevation of a carbon black pellet dryer.

The dryer 14 is shown in more detail in FIGURE 2 and is comprised of furnace 26 having a firebox 27 in the lower portion thereof and containing rotating drum 28. Wet pellets are introduced to dryer 14 by means of conveyor 13 and dry pellets are removed from dryer 14 by means of conveyor 15. The drum 28 is rotated by means of motor 44. Fuel is introduced to the firebox through conduit 19 and valve 21 and steam is introduced into firebox 27, in case of termination of rotation of motor 44 by means of conduit 23 and valve 24.

Figure 3:
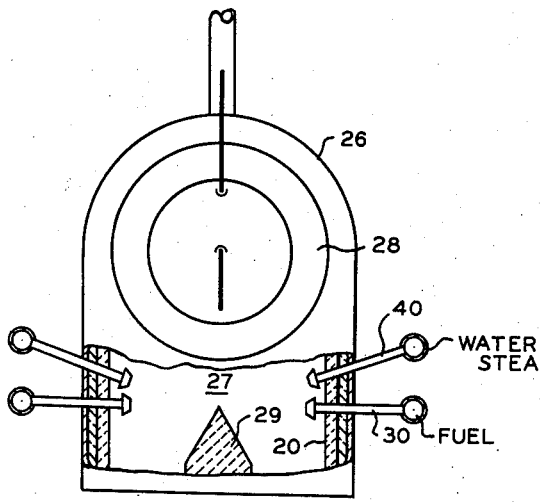
FIGURE 3 is an elevation, partly in section, showing an end view of the dryer of FIGURE 2.

FIGURE 3 shows the firebox 27 of furnace 26 containing therein a stack of firebrick 29, fuel nozzles 30 and water or steam nozzles 40. The firebox walls are lined with firebrick indicated at 20. Fuel nozzles 30 are positioned in firebox 27 so as to be aligned substantially with the apex of the prism of firebrick 29 and water nozzles 40 are positioned so as to spray water or steam about midway between the apex of prism 29 and the bottom of rotating drum 28.

Figure 4:
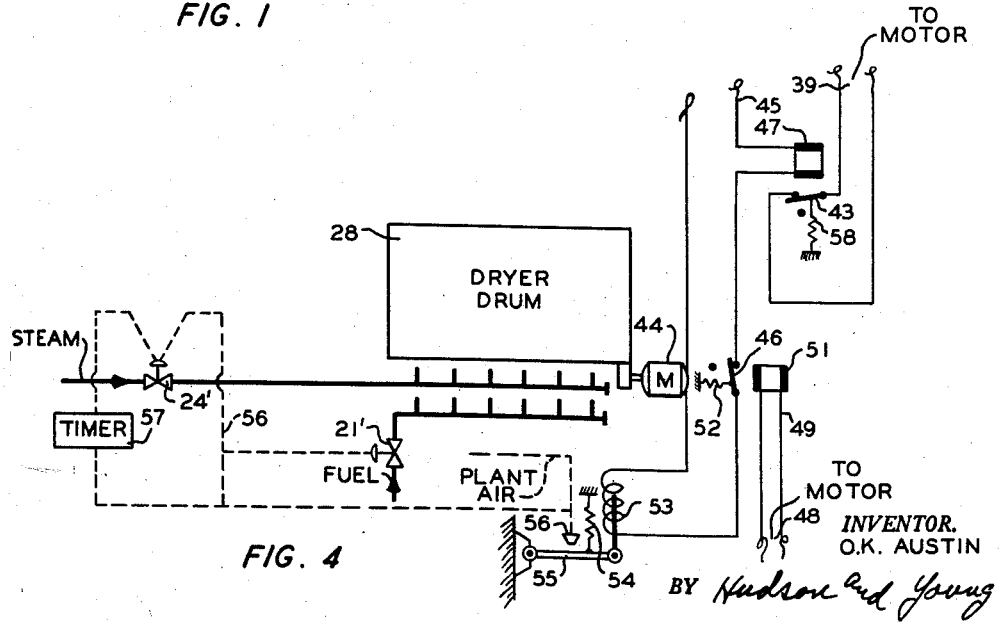
FIGURE 4 is a detailed schematic circuit drawing of a portion of the motor control system.

An electrical circuit such as that connected with motors 48, 44, 39, 35 and 31 is shown in FIGURE 4. Motor 44 is connected to the power line 32 of FIGURE 1 by line 45 and switch 46 is maintained in closed position by relay coil 51 in the lead line 49 which connects power line 32 of FIGURE 1 to motor 48. Upon failure of motor 48, current ceases to flow through line 41 and relay coil 51 and spring 52 open switch 46 cutting off the power to motor 44 and stopping rotation of dryer drum 28. Current also ceases to flow through solenoid 53 so that spring 54 pulls bar 55 against the open end of airline 56 so as to increase the plant air pressure in line 56 causing fuel valve 21' to close and causing water or steam valve 24' to open and at the same time actuating timer 57 which closes valve 24' after a predetermined period of time. When switch 46 in electrical line 45 is opened and current ceases to flow through relay 47, spring 58 opens switch 43 so as to stop motor 39. Motors 35 and 31 are similarly stopped in sequence and valve 17 is closed by failure of current in line 36.

Valves 21 and 24 are shown in FIGURE 1 as solenoid valves and are shown in FIGURE 4 as air operated motor valves 21' and 24'. Any conventional valve can be used which can be caused to open or to close upon termination of flow of electrical current through a circuit operatively connected to such valves.

Timer 57 can be any timing device which will close valve 24 or valve 24' after a predetermined period of time such as a spring operatively connected to the valve stem and to a clockwork timer so that the travel of the valve stem in opening the valve upon failure of current starts the timer and the timer then releases the spring which closes the valve. Alternatively an air-operated diaphragm can be connected to the stem of valve 24 or 24' and to the instrument air system of the plant so that air is supplied to the diaphragm chamber at a predetermined rate and the air pressure can build up in the diaphragm chamber sufficient to close valve 24 or 24' only after bar 55 is pressed against the open end of air line 56 for a predetermined period of time.

The valves to stop the flow of fuel and to start the flow of water or steam will operate about 5 seconds after the current ceases to flow in the solenoids of the valves. Thus if current is stopped momentarily such as by opening one switch and closing another the operation of the plant is not interrupted. Either water or steam can be used to cool the bottom of the drum and is directed into the firebox about midway between the bottom of the drum and the apex of the prism of firebrick to avoid shock cooling of either the drum or the firebrick. The water is allowed to run about 10 minutes although the amount of water will depend upon the size of the drum, the temperature of the drum and other considerations peculiar to each plant.

Reasonable variations and modifications are possible within the scope of this disclosure without departing from the spirit and scope of the invention.

That which is claimed is:

1. Pelleting apparatus comprising a mixing conveyor driven by a first motor; a first conveyor means driven by a second motor to deliver material to be pelleted to said mixing conveyor; means having a first control valve therein to introduce a pelleting liquid into said mixing conveyor; a rotary dryer driven by a third motor; a firebox in heating relationship with said dryer; means having a second control valve therein to introduce fuel to the firebox of said dryer; means having a third control valve therein to introduce water to the firebox of said dryer; a second conveyor means driven by a fourth motor to deliver pellets from said mixing conveyor to said dryer; a third conveyor means driven by a fifth motor to remove pellets from said dryer; means responsive to termination of rotation of said fifth motor to stop said third, fourth, first and second motors in sequence; means responsive to termination of rotation of said third motor to close said second control valve and to open said third control valve; and means responsive to termination of rotation of said first motor to close said first control valve.

2. Pelleting apparatus comprising a mixing conveyor driven by a first motor; a first conveyor means driven by a second motor to deliver material to be pelleted to said mixing conveyor; means having a first control valve therein to introduce a pelleting liquid into said mixing conveyor; a rotary dryer driven by a third motor; a firebox in heating relationship with said dryer; means having a second control valve therein to introduce fuel to the firebox of said dryer; means having a third control valve therein to introduce water to the firebox of said dryer; a second conveyor means driven by a fourth motor to deliver pellets from said mixing conveyor to said dryer; a third conveyor means driven by a fifth motor to remove pellets from said dryer; means responsive to termination of rotation of any one of said fifth, third, fourth, first and second motors to stop the remainder thereof in the sequence named; means responsive to termination of rotation of said third motor to close said second control valve and to open said third control valve; and means responsive to termination of rotation of said first motor to close said first control valve.

3. The apparatus of claim 2 wherein said means having a third control valve therein has a timing device therein to close said control valve after it has been opened for a predetermined period of time.

4. The apparatus of claim 2 wherein each of said motors is connected to a source of electrical energy by a power lead containing a normally open switch and a relay coil so that the relay coil in the power lead to the fifth motor maintains the switch closed in the power lead to the third motor so long as the fifth motor is rotating, the relay coil in the power lead to the third motor maintains the switch closed in the power lead to the fourth motor so long as the third motor is rotating, the relay coil in the power lead to the fourth motor maintains the switch closed in the power lead to the first motor so long as the fourth motor is operating, and the relay coil in the power lead to the first motor maintains the switch closed in the power lead to the second motor so long as the first motor is rotating; and wherein the power lead to the third motor has therein a second relay coil to maintain said second control valve open and said third control valve closed so long as the third motor is rotating.

5. The apparatus of claim 4 wherein the second relay coil in the power lead to the third motor upon termination of rotation of said third motor actuates a means to increase the plant air pressure so as to close said second control valve and to open said third control valve.

6. The apparatus of claim 4 wherein said second relay coil in the power lead to the third motor upon termination of rotation of said third motor terminates the electrical energy supplied to the solenoids which operate said second control valve and said third control valve so that said second control valve is closed and said third control valve is opened.

7. The apparatus of claim 2 wherein the means having a third control valve therein has associated therewith a timer actuated by opening of said third control valve to close said third control valve after a predetermined period of time.

8. In the process of producing carbon black pellets wherein loose carbon black is agitated with a pelletizing liquid to form pellets and the formed pellets are dried in a drum which is rotated in heating relationship with a heating means; the steps which comprise terminating the operation of said heating means and introducing a cooling fluid into cooling relationship with said drum when rotation of said drum ceases.

9. In the process of producing carbon black pellets wherein loose carbon black is agitated with a pelletizing liquid to form pellets and the formed pellets are dried in a drum which is rotated in heating relationship with a gas fired furnace, the steps which comprise terminating the supply of gas to said furnace and introducing a flow of water to said furnace when rotation of said drum ceases.

References Cited in the file of this patent

UNITED STATES PATENTS

| | | |
|---|---|---|
| 2,304,382 | Shoeld | Dec. 8, 1942 |
| 2,457,962 | Whaley | Jan. 4, 1949 |
| 2,753,926 | Beach | July 10, 1956 |
| 2,949,958 | Wolters | Aug. 23, 1960 |